(12) United States Patent
Araya et al.

(10) Patent No.: US 8,730,574 B2
(45) Date of Patent: May 20, 2014

(54) MICROSCOPE SYSTEM

(75) Inventors: Akinori Araya, Kanagawa (JP); Tatsuo Nakata, Tokyo (JP)

(73) Assignee: Olympus Corporation, Tokyo (JP)

( * ) Notice: Subject to any disclaimer, the term of this patent is extended or adjusted under 35 U.S.C. 154(b) by 413 days.

(21) Appl. No.: 12/955,428

(22) Filed: Nov. 29, 2010

(65) Prior Publication Data

US 2011/0134516 A1 Jun. 9, 2011

(30) Foreign Application Priority Data

Dec. 3, 2009 (JP) ................................ 2009-275584

(51) Int. Cl.
*G02B 21/06* (2006.01)
*G02B 21/00* (2006.01)

(52) U.S. Cl.
CPC ............ *G02B 21/0032* (2013.01); *G02B 21/06* (2013.01); *G02B 21/00* (2013.01)
USPC ......................................... 359/385; 359/368

(58) Field of Classification Search
USPC ......................................... 359/368, 385–398
See application file for complete search history.

(56) References Cited

U.S. PATENT DOCUMENTS

| | | | |
|---|---|---|---|
| 4,643,540 A | 2/1987 | Kawasaki et al. | |
| 6,330,106 B1 * | 12/2001 | Greenwald et al. | 359/398 |
| 7,382,531 B2 * | 6/2008 | Tsuchiya et al. | 359/395 |
| 7,400,446 B2 | 7/2008 | Mikuriya et al. | |
| 7,456,378 B2 | 11/2008 | Sasaki et al. | |
| 7,646,534 B2 * | 1/2010 | Harada et al. | 359/381 |
| 8,179,597 B2 | 5/2012 | Namba et al. | |
| 2006/0000962 A1 | 1/2006 | Imabayashi et al. | |
| 2006/0072190 A1 * | 4/2006 | Okugawa | 359/368 |
| 2008/0036985 A1 * | 2/2008 | Clarke et al. | 355/53 |
| 2008/0247038 A1 * | 10/2008 | Sasaki et al. | 359/395 |
| 2008/0266653 A1 * | 10/2008 | Korpinen et al. | 359/368 |
| 2011/0242308 A1 | 10/2011 | Igarashi et al. | |

FOREIGN PATENT DOCUMENTS

| | | | |
|---|---|---|---|
| JP | 59-172617 A | 9/1984 | |
| JP | 03-091709 A | 4/1991 | |
| JP | 08-233544 A | 9/1996 | |
| JP | 10-090604 A | 4/1998 | |
| JP | 2000-035540 A | 2/2000 | |
| JP | 2002-267942 A | 9/2002 | |
| JP | 2005-198565 A | 7/2005 | |
| JP | 2005-309415 A | 11/2005 | |
| JP | 2006-003653 A | 1/2006 | |
| JP | 2006-162764 A | 6/2006 | |
| JP | 2006-235420 A | 9/2006 | |

(Continued)

*Primary Examiner* — Thong Nguyen
(74) *Attorney, Agent, or Firm* — Holtz, Holtz, Goodman & Chick, PC

(57) ABSTRACT

A microscope system includes a culture unit for holding and cultivating a specimen while maintaining constant temperature and humidity; a stage for holding the culture unit; a first light-converging optical system for converging illumination light emitted from a light source on the specimen; a second light-converging optical system for converging transmitted light that has passed through the specimen; a transmitted-light pinhole provided at a position optically conjugate to the light-converging position of illumination light on the specimen to cut off part of transmitted light converged by the second light-converging optical system; a transmitted-light detector that detects transmitted light that has passed through the transmitted-light pinhole; a moving system for moving the first and second light-converging optical systems, the transmitted-light pinhole, and the transmitted-light detector and the stage relative to each other; a housing that encloses these components and cuts off external light; and a control unit.

11 Claims, 8 Drawing Sheets

(56) References Cited

FOREIGN PATENT DOCUMENTS

| | | | |
|---|---|---|---|
| JP | 2007-316281 A | 12/2007 |
| JP | 2008-039882 A | 2/2008 |
| JP | 2008-256927 A | 10/2008 |
| JP | 4288323 B1 | 1/2009 |
| WO | 2007/139201 A1 | 12/2007 |

* cited by examiner

MICROSCOPE SYSTEM

BACKGROUND OF THE INVENTION

1. Field of the Invention

The present invention relates to a microscope system.

This application is based on Japanese Patent Application No. 2009-275584, the content of which is incorporated herein by reference.

2. Description of Related Art

As a conventional microscope system, a transmission-type stage-scanning microscope is known, in which a specimen is placed on a stage, and the stage is moved to scan the specimen with illumination light emitted from a light source with the illumination light fixed, and light that has passed through the specimen is detected (see, for example, Japanese Unexamined Patent Application, Publication No. 2008-39882).

BRIEF SUMMARY OF THE INVENTION

It is an object of the present invention to provide a microscope system capable of, even when a specimen, such as cells, in culture is observed, performing high-accuracy observation while suppressing the occurrence of distortion of an optical system and preventing an increase in noise resulting from external light.

In order to achieve the above object, the present invention provides the following means.

The present invention provides a microscope system including: a culture unit for holding and cultivating a specimen while marinating constant temperature and humidity; a stage for holding the culture unit; a first light-converging optical system for converging illumination light emitted from a light source on the specimen; a second light-converging optical system for converging transmitted light that has passed through the specimen irradiated with illumination light converged by the first light-converging optical system; a transmitted-light pinhole provided at a position optically conjugate to a light-converging position of illumination light on the specimen to cut off part of transmitted light converged by the second light-converging optical system; a transmitted-light detector that detects transmitted light that has passed through the transmitted-light pinhole; a moving system for moving the stage with respect to the first and second light-converging optical systems, the transmitted-light pinhole, and the transmitted-light detector relative to each other; a housing that encloses the culture unit, the stage, the first light-converging optical system, the second light-converging optical system, the transmitted-light pinhole, the transmitted-light detector, and the moving system and cuts off external light; and a temperature control unit for controlling temperature in the housing.

According to the present invention, illumination light emitted from a light source is converged by the first light-converging optical system, and a specimen cultivated in the culture unit mounted on the stage is irradiated with the illumination light converged by the first light-converging optical system, and transmitted light that has passed through the specimen is converged by the second light-converging optical system. Then, only part of the transmitted light converged by the second light-converging optical system passes through the transmitted-light pinhole, and is then detected by the transmitted-light detector. The position of the stage at a time when transmitted light is detected by the transmitted-light detector and the intensity of the transmitted light are stored to create a transmitted-light image.

In the case of the microscope system according to the present invention, the housing encloses the culture unit, the stage, the first light-converging optical system, the second light-converging optical system, the transmitted-light pinhole, the transmitted-light detector, and the moving system and cuts off external light, and therefore external light incident on the transmitted-light detector can be reduced. This makes it possible to create an image with reduced noise. Further, the temperature in the housing can be controlled by the temperature control unit so that the difference between the temperature in the culture unit, in which temperature and humidity are kept constant, and the temperature of an optical system provided outside the culture unit does not become too large. This makes it possible to suppress the occurrence of distortion of the optical system caused by temperature difference, thereby suppressing the displacement of an observation position during prolonged observation. This makes it possible to observe a specimen with a high degree of accuracy.

The microscope system according to the present invention may further include: a scanning unit provided between the light source and the first light-converging optical system to scan illumination light emitted from the light source; a fluorescence separation unit for separating fluorescence generated at the specimen by allowing the scanning unit to scan illumination light over the specimen, converged by the first light-converging optical system, and returned via the scanning unit; an incident-light pinhole provided at a position optically conjugate to the specimen to cut off part of fluorescence separated by the fluorescence separation unit; and an incident-light detector that detects fluorescence that has passed through the incident-light pinhole, wherein the housing encloses also the scanning unit, the fluorescence separation unit, the incident-light pinhole, and the incident-light detector.

In this case, illumination light emitted from a light source is scanned by the scanning unit with the stage stopped and is converged by the first light-converging optical system on a specimen, and fluorescence generated at the specimen is converged by the first light-converging optical system, returned via the scanning unit, and separated by the fluorescence separation unit. Then, only fluorescence that has passed through the incident-light pinhole is detected by the incident-light detector. Therefore, a confocal fluorescence image can be acquired, that is, epifluorescence observation of a specimen can be performed by storing information about the position of the scanning unit at a time when fluorescence is detected by the incident-light detector during scanning and the intensity of the fluorescence while bringing them into correspondence with each other. On the other hand, transmitted-light observation of a specimen can be performed by stopping the operation of the scanning unit.

Further, in this case, the scanning unit, the fluorescence separation unit, the incident-light pinhole, and the incident-light detector are also enclosed by the housing. This makes it possible to perform epifluorescence observation while reducing noise resulting from external light. In addition, it is also possible to suppress the displacement of an observation position caused by temperature difference even during prolonged fluorescence observation, thereby making it possible to observe a specimen with a high degree of accuracy.

Further, in the microscope system according to the present invention, the culture unit may contain a culture broth, and the second light-converging optical system may be arranged at a position away from a surface of the culture broth. In this case, the microscope system according to the present invention may further include: a liquid-level detection unit for detecting a liquid level of the culture broth; and a position adjusting system for adjusting a position of the incident-light pinhole or the second light-converging optical system in a direction along an optical axis based on a position of surface of the culture broth detected by the liquid-level detection unit.

By providing the liquid-level detection unit and the position adjusting system, even when the liquid level of the culture broth contained in the culture unit varies, the position of the incident-light pinhole or the second light-converging optical system in a direction along an optical axis can be adjusted by the position adjusting system based on the position of surface of the culture broth detected by the liquid-level detection unit so that the optically conjugate positional relationship between a specimen and the incident-light pinhole can be maintained. Therefore, even when the liquid level of the culture broth varies, clear transmitted-light observation of a specimen can be performed.

Further, in the microscope system according to the present invention, the culture unit may contain a culture broth and the second light-converging optical system may include an immersion lens to be kept immersed in the culture broth.

By keeping the immersion lens constituting the second light-converging optical system immersed in the culture broth, the optically conjugate positional relationship between a specimen and the incident-light pinhole can be easily maintained even when the liquid level of the culture broth varies. Therefore, even when the liquid level of the culture broth varies, clear transmitted-light observation of a specimen can be performed.

Further, in the microscope system according to the present invention, the light source may be a laser light source that emits laser light. In this case, the microscope system according to the present invention may further include: a first differential interference element that divides laser light emitted from the laser light source into polarization components having polarization planes intersecting orthogonally to each other before the laser light enters the specimen; a second differential interference element that combines polarization components, which have polarization planes intersecting orthogonally to each other and have passed through the specimen, into polarized light having a single polarization plane; and a polarization element that cuts off light other than combined polarized light produced by the second differential interference element, wherein the housing encloses also the first and second differential interference elements and the polarization element.

By providing the first and second differential interference elements and the polarization element, differential interference contrast observation of a specimen can be performed. Also in this case, noise resulting from external light can be reduced, and the displacement of an observation position caused by temperature difference can be suppressed even during prolonged differential interference contrast observation. This makes it possible to observe a specimen with a high degree of accuracy.

Further, in the microscope system according to the present invention, the first and second light-converging optical systems may be light-converging optical systems for phase-contrast observation.

Also in this case, noise resulting from external light can be reduced, and phase-contrast observation of a specimen can be performed while the displacement of an observation position caused by temperature difference is suppressed even during prolonged observation.

Further, the microscope system according to the present invention may further include a light flux separation unit for separating illumination light emitted from the light source into a plurality of light fluxes, wherein a plurality of the transmitted-light pinholes are provided at positions optically conjugate to light-converging positions of a plurality of light fluxes, which are separated by the light flux separation unit, on the specimen, and a plurality of the transmitted-light detectors are provided to detect a plurality of transmitted-light fluxes that have passed through the transmitted-light pinholes, respectively.

In this case, a plurality of light fluxes separated by the light flux separation unit are simultaneously converged on a specimen and pass through the specimen, and only transmitted-light fluxes that have passed through the transmitted-light pinholes are detected by the transmitted-light detectors, respectively. This makes it possible to perform multipoint diascopic observation, thereby making it possible to speedily create one image.

Further, when the microscope system according to the present invention includes the light flux separation unit, a plurality of the first light-converging optical systems having different magnifications may be provided so as to be switchable, and a plurality of the second light-converging optical systems having different magnifications may be provided so as to be switchable. In this case, when magnification is changed, the first and second light-converging optical systems are switched so as to have the same magnification.

This makes it possible to maintain the optically conjugate positional relationship between a specimen and the transmitted-light pinholes and therefore to continue to perform diascopic confocal observation even when magnification is changed.

Further, when the microscope system according to the present invention includes the light flux separation unit, a plurality of the first light-converging optical systems having different magnifications may be provided so as to be switchable, and the transmitted-light pinholes may be formed by a spatial modulator capable of changing a reflection or transmission pattern. In this case, when the magnification of the first light-converging optical system is changed, the reflection or transmission pattern of the transmitted-light pinholes is changed.

This makes it possible, even when the magnification of the first light-converging optical system is changed, to maintain the optically conjugate positional relationship between a specimen and the transmitted-light pinholes by changing the reflection or transmission pattern of the spatial modulator forming the transmitted-light pinholes and therefore to continue to perform diascopic confocal observation without changing the second light-converging optical system.

Further, the microscope system according to the present invention may further include: a conversion optical system for converting illumination light emitted from the light source into a line beam; a first spatial modulator configured to be capable of changing a reflection or transmission pattern to selectively reflect or transmit part of a line beam converted by the conversion optical system to produce a plurality of light fluxes; and a second spatial modulator configured to be capable of changing a reflection or transmission pattern and driven so that reflection or transmission positions thereof have an optically conjugate positional relationship with those of the first spatial modulator, wherein a plurality of the transmitted-light pinholes are formed by the second spatial modulator, and wherein a plurality of the transmitted-light detectors are provided to detect a plurality of transmitted-light fluxes that have passed through the transmitted-light pinholes, respectively.

In this case, illumination light is converted into a line beam by the conversion optical system, and part of the line beam is selectively reflected by or passed through the reflection or transmission pattern of the first spatial modulator, and as a result, a plurality of light fluxes are produced. The light fluxes are converged on a specimen by the first light-converging optical system, and then transmitted light that has passed through the specimen is converged by the second light-converging optical system and enters the transmitted-light pinholes. The transmitted-light pinholes are formed by the second spatial modulator. The reflection or transmission pattern of the second spatial modulator is set so that the optically conjugate positional relationship between the transmitted-light pinholes and the reflection or transmission positions of the first spatial modulator is maintained. Therefore, multipoint diascopic confocal observation can be performed by detecting only transmitted light that has passed through the transmitted-light pinholes by the transmitted-light detectors.

According to the present invention, it is possible to provide a microscope system capable of observing a specimen with a high degree of accuracy while suppressing the occurrence of distortion of an optical system and preventing an increase in noise resulting from external light.

DETAILED DESCRIPTION OF THE INVENTION

Hereinbelow, a microscope system 1 according to a first embodiment of the present invention will be described with reference to FIGS. 1 and 2.

Figure 1:
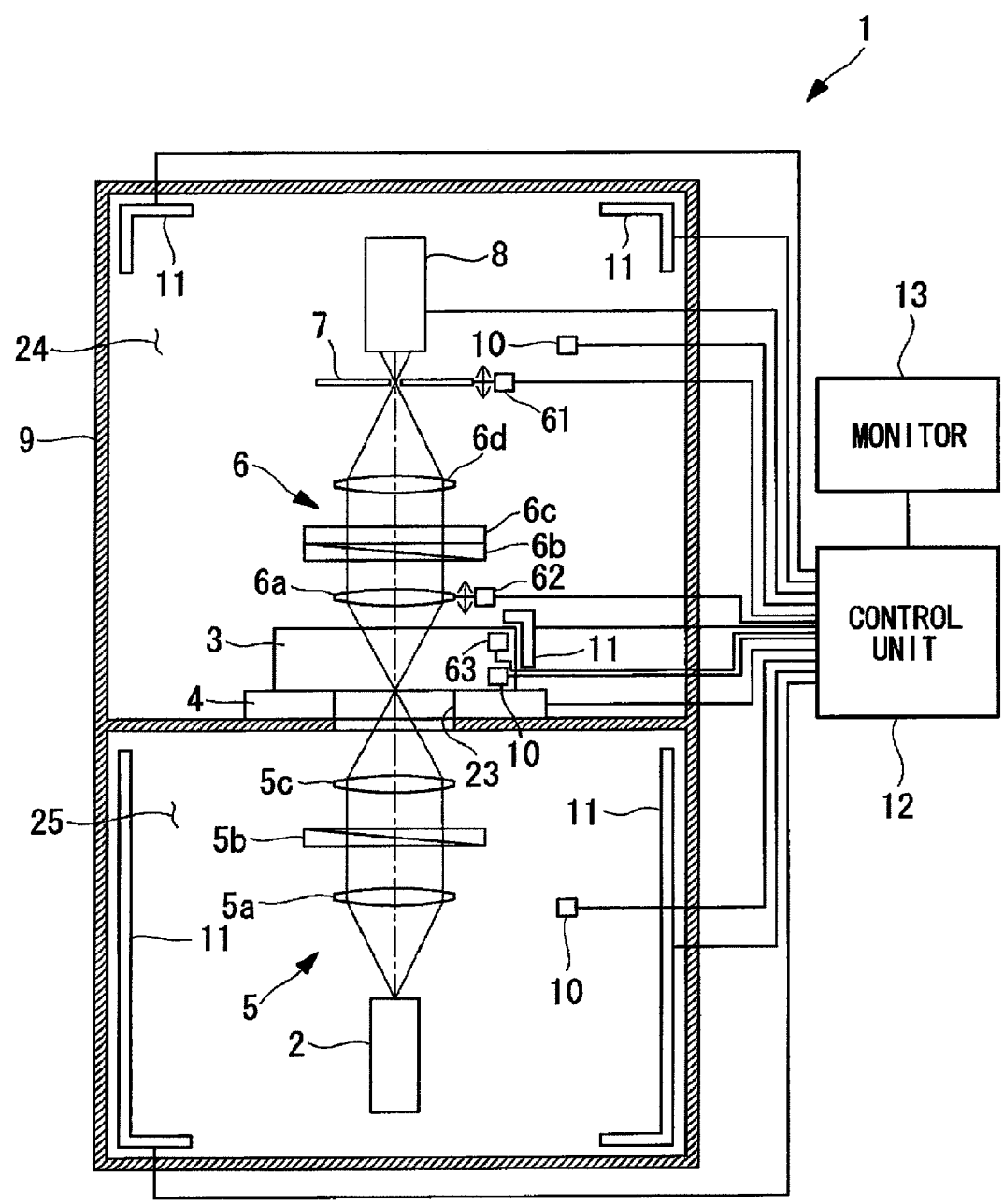
FIG. 1 is a schematic diagram showing the overall structure of a microscope system according to a first embodiment of the present invention.

As shown in FIG. 1, the microscope system 1 according to the first embodiment of the present invention includes a laser light source 2, a culture unit 3 for holding and cultivating a specimen A, a stage 4 for mounting and moving the culture unit 3, a first light-converging optical system 5 for converging light emitted from the laser light source 2 to irradiate the specimen A with converging light, a second light-converging optical system 6 for converging transmitted light that has passed through the specimen A, a pinhole member 7 for cutting off part of transmitted light converged by the second light-converging optical system 6, a photodetector 8 that detects transmitted light that has passed through the pinhole member 7, a housing 9 that encloses these components, temperature sensors 10 and heaters 11 provided in the housing 9, a control unit 12 for controlling these components, and a monitor 13 connected to the control unit 12.

Figure 2:
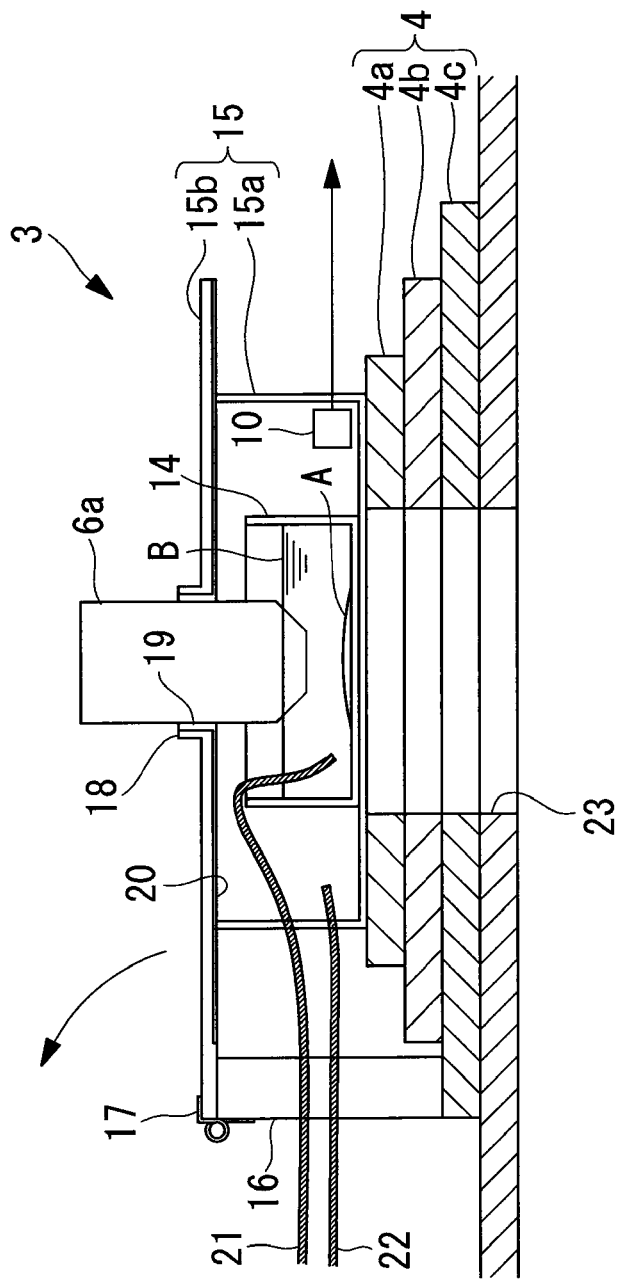
FIG. 2 is a detailed enlarged sectional view of a culture unit of the microscope system shown in FIG. 1 and its vicinity.

As shown in FIG. 2, the culture unit 3 includes a culture vessel 14 for holding a culture broth B, in which the specimen A is to be immersed, and an outer vessel 15 that encloses the culture vessel 14. The culture vessel 14 is opened at its upper end within the outer vessel 15. The outer vessel 15 includes a vessel main body 15a and a cover 15b. The vessel main body 15a is opened at its upper end. The cover 15b is placed on the vessel main body 15a so as to come into contact with the opening of the vessel main body 15a to close the opening of the vessel main body 15a, and is movable relatively to the vessel main body 15a in a horizontal direction. The cover 15b is fixed to a Z stage 4c (which will be described later), and is moved in a vertical direction by moving the Z stage 4c.

A column 16 is fixed to the Z stage 4c, and the cover 15b is swingably fixed to the column 16 by a hinge 17.

The cover 15b has a through hole 18 at its center, through which a second objective lens 6a (which will be described later) constituting a part of the second light-converging optical system 6 passes. A joint between the through hole 18 and the second objective lens 6a is hermetically sealed with a sealing member 19 so that the cover 15b and the second objective lens 6a are movable relative to each other in a vertical direction. A joint between the vessel main body 15a and the cover 15b is hermetically sealed with a sealing member 20 so that the vessel main body 15a and the cover 15b are movable relative to each other in a horizontal direction.

A tube 21 for circulating the culture broth B is connected to the inside of the culture vessel 14 of the culture unit 3.

Further, a tube 22 for supplying steam or $CO_2$ is connected to the space between the culture vessel 14 and the outer vessel 15 of the culture unit 3. One of the temperature sensors 10 is provided in this space to detect the temperature in this space.

As shown in FIG. 2, the stage 4 includes an X stage 4a for moving the outer vessel 15 mounted thereon in a horizontal direction (i.e., in an X direction), and a Y stage 4b for moving the X stage 4a in a horizontal direction orthogonal to the X direction (i.e., in a Y direction), and the Z stage 4c for moving the X stage 4a and the Y stage 4b in a vertical direction (i.e., in a Z direction). Each of the X stage 4a, the Y stage 4b, and the Z stage 4c has an opening 23 at a position located under the outer vessel 15 so that illumination light can enter the opening 23 from vertically below to irradiate the specimen A in the culture unit 3 with the illumination light from the bottom surface side of the vessel main body 15a.

The first light-converging optical system 5 includes a converging lens 5a, a first differential interference element 5b, and a first objective lens 5c. The converging lens 5a converges laser light. The first differential interference element 5b divides laser light converged by the converging lens 5a into polarization components having polarization planes intersecting orthogonally to each other. The first objective lens 5c converges laser light, which has passed through the first differential interference element 5b, on the specimen A arranged above it.

The second light-converging optical system 6 includes the second objective lens 6a, a second differential interference element 6b, a polarization element 6c, and a converging lens 6d. The second objective lens 6a converges laser light that has passed through the specimen A. The second differential interference element 6b combines polarization components, which have polarization planes intersecting orthogonally to each other and have been converged by the second objective lens 6a, into laser light having a single polarization plane. The polarization element 6c cuts off laser light other than combined polarized light that has passed through the second differential interference element 6b. The converging lens 6d converges laser light that has passed through the polarization element 6c.

As shown in FIG. 2, the second objective lens 6a used in this embodiment is an immersion lens, and is therefore immersed in the culture broth B contained in the culture vessel 14 when used.

The pinhole member 7 is arranged at a position optically conjugate to the position of the light-converging point of laser light on the specimen A. Therefore, only laser light that has passed through the light-converging point can pass through the pinhole member 7, and laser light that has not passed through the light-converging point is cut off.

The photodetector 8 is, for example, a photomultiplier.

As shown in FIG. 1, the housing 9 encloses the optical elements, such as lenses, arranged above and below the stage 4 to cut them off from the outside. This makes it possible to prevent the entry of external light into spaces 24 and 25 located above and below the stage 4, particularly into an area around the photodetector 8 and the pinhole member 7.

As described above, one of the temperature sensors 10 is arranged in the space between the culture vessel 14 and the outer vessel 15. Further, the other temperature sensors 10 are arranged in the spaces 24 and 25 located above and below the stage 4 within the housing 9 to detect the temperature in the upper space 24 and the temperature in the lower space 25, respectively.

The heaters 11 are arranged within the housing 9. One of the heaters 11 is arranged near the culture unit 3 and the other heaters 11 are arranged in the upper space 24 and the lower space 25 so that the upper space 24, the lower space 25, and the culture unit 3 can be heated independently of one another.

The control unit 12 receives temperature information detected by the temperature sensors 10 and controls the heaters 11 to adjust the temperatures in the upper space 24, the lower space 25, and the culture unit 3 within the housing 9 to desired levels, respectively.

Further, the control unit 12 drives the stage 4 to move the culture unit 3, and stores information about the position of the stage 4 at a time when transmitted light is detected by the photodetector 8 and the intensity of the transmitted light while bringing them into correspondence with each other. The control unit 12 is configured to create a two-dimensional differential interference contrast image of the specimen A by arranging stored data about the intensity of transmitted light based on the information about the position of the stage 4.

The monitor 13 is configured to display a transmitted light differential interference contrast image created by the control unit 12.

Hereinbelow, the function of the microscope system 1 according to the first embodiment of the present invention having such a structure as described above will be described.

In a case where the specimen A is observed using the microscope system 1 according to the first embodiment of the present invention, culture conditions such as humidity and $CO_2$ concentration in the culture vessel 14 are kept constant by supplying steam or $CO_2$ through the tube 22 while the culture broth B contained in the culture vessel 14 of the culture unit 3 is circulated through the tube 21. In addition, the control unit 12 controls the heater 11 provided near the culture unit 3 based on the temperature in the culture unit 3 detected by the temperature sensor 10 so that the temperature in the culture unit 3 is adjusted to a predetermined level, for example, 37° C.

Further, the control unit 12 controls the other heaters 11 provided in the upper space 24 and the lower space 25 based on temperatures detected by the temperature sensors 10 provided in the upper space 24 and the lower space 25 within the housing 9 so that the temperature in the housing 9 is adjusted to a predetermined level.

Then, in a state where the temperature in the housing 9 and the temperature in the culture unit 3 are kept constant, the control unit 12 drives the stage 4 to arrange the specimen A at a desired position. In this state, laser light emitted from the laser light source 2 is converged by the first light-converging optical system 5 on the specimen A, and transmitted light that has passed through the specimen A is converged by the second light-converging optical system 6, and only part of the transmitted light passes through the pinhole member 7 and is detected by the photodetector 8. The control unit 12 stores the intensity of transmitted light detected by the photodetector 8 while bringing it into correspondence with information about the position of the stage 4, and then moves the stage 4 to the next position. Then, the above operations are repeated.

As a result, laser light is allowed to pass through a desired region of the specimen A to acquire a transmitted-light image of the specimen A. As described above, since the first light-converging optical system 5 has the first differential interference element 5b and the second light-converging optical system 6 has the second differential interference element 6b and the polarization element 6c, a differential interference contrast image is acquired as a transmitted-light image. The thus obtained differential interference contrast image is displayed on the monitor 13.

In this case, the optical elements constituting the microscope system 1 according to the first embodiment of the present invention are enclosed by the housing 9. This is advantageous in that the entry of external light into the optical elements can be prevented to reduce the appearance of noise in a resultant transmitted laser light image to allow clear observation.

Further, the temperatures in the upper and lower spaces 24 and 25 within the housing 9 are kept constant by controlling the heaters 11 based on temperatures detected by the temperature sensors 10. This is also advantageous in that the occurrence of distortion of the optical elements caused by temperature difference can be prevented, which makes it possible to prevent the problem that an observation position is displaced during prolonged observation before it occurs.

Further, according to the first embodiment of the present invention, the second objective lens 6a constituting the second light-converging optical system 6 is an immersion lens, and is therefore immersed in the culture broth B when used. Therefore, the optically conjugate relationship between the light-converging point of laser light on the specimen A and the pinhole member 7 is maintained even when the liquid level of the culture broth B varies, which makes it possible to always acquire clear transmitted-light images.

Further, according to the first embodiment of the present invention, a differential interference contrast image is acquired as a transmitted-light image. Therefore, even when the specimen A is transparent, the form of the specimen A can be clearly observed.

In this case, when the Z stage 4c is moved to adjust the focal position of the second objective lens 6a, both the vessel main body 15a and the cover 15b are vertically moved together with the Z stage 4c. The cover 15b can be slidably moved in a vertical direction because the sealing member 19 is provided between the through hole 18 provided in the cover 15b and the second objective lens 6a. Therefore, even when the cover 15b is moved in a vertical direction parallel to the second objective lens 6a by moving the Z stage 4c, the joint between the through hole 18 and the second objective lens 6a is kept hermetically sealed.

Further, when the X stage 4a and the Y stage 4b are moved to change the light-converging point of laser light on the specimen A, the vessel main body 15a mounted on the X stage 4a is also moved in a horizontal direction. The vessel main body 15a can be slidably moved in a horizontal direction because the sealing member 20 is provided between the upper end of the vessel main body 15a and the lower surface of the cover 15b. Therefore, even when the vessel main body 15a is moved in a horizontal direction perpendicular to the second objective lens 6a by moving the X stage 4a and the Y stage 4b, the joint between the cover 15b and the vessel main body 15a is kept hermetically sealed.

Therefore, the inside of the outer vessel 15a is kept hermetically sealed and the culture conditions are kept constant. This makes it possible to keep the specimen A, such as living cells, healthy even during prolonged observation of the specimen A.

It is to be noted that according to the first embodiment of the present invention, the second objective lens 6a is an immersion lens and is kept immersed in the culture broth B. However, even when the second objective lens 6a is an immersion lens, it may be arranged above the surface of the culture broth B during observation without immersing in the culture broth B. Alternatively, the second objective lens 6a may be a lens other than an immersion lens. However, in either case, the light-converging position of transmitted light on the pinhole member 7 is displaced when the liquid level of the culture broth B varies, and therefore transmitted light that has passed through the light-converging point of laser light on the specimen A cannot be detected. However, such a problem can be overcome by providing a liquid-level sensor 63 for detecting the position of the surface of the culture broth B and a position adjusting system 61, 62 for moving at least one of the pinhole member 7 and the second objective lens 6a in a vertical direction. In this case, the control unit 12 allows the position adjusting system 61, 62 to move at least one of the pinhole member 7 and the second objective lens 6a in a vertical direction based on the position of surface of the culture broth B detected by the liquid-level sensor 63.

Hereinbelow, a microscope system 30 according to a second embodiment of the present invention will be described with reference to FIGS. 3 and 4.

In the following description of the second embodiment, components having the same structure as those of the above-described microscope system 1 according to the first embodiment of the present invention are represented by the same reference numerals, and description thereof will be omitted.

Figure 3:
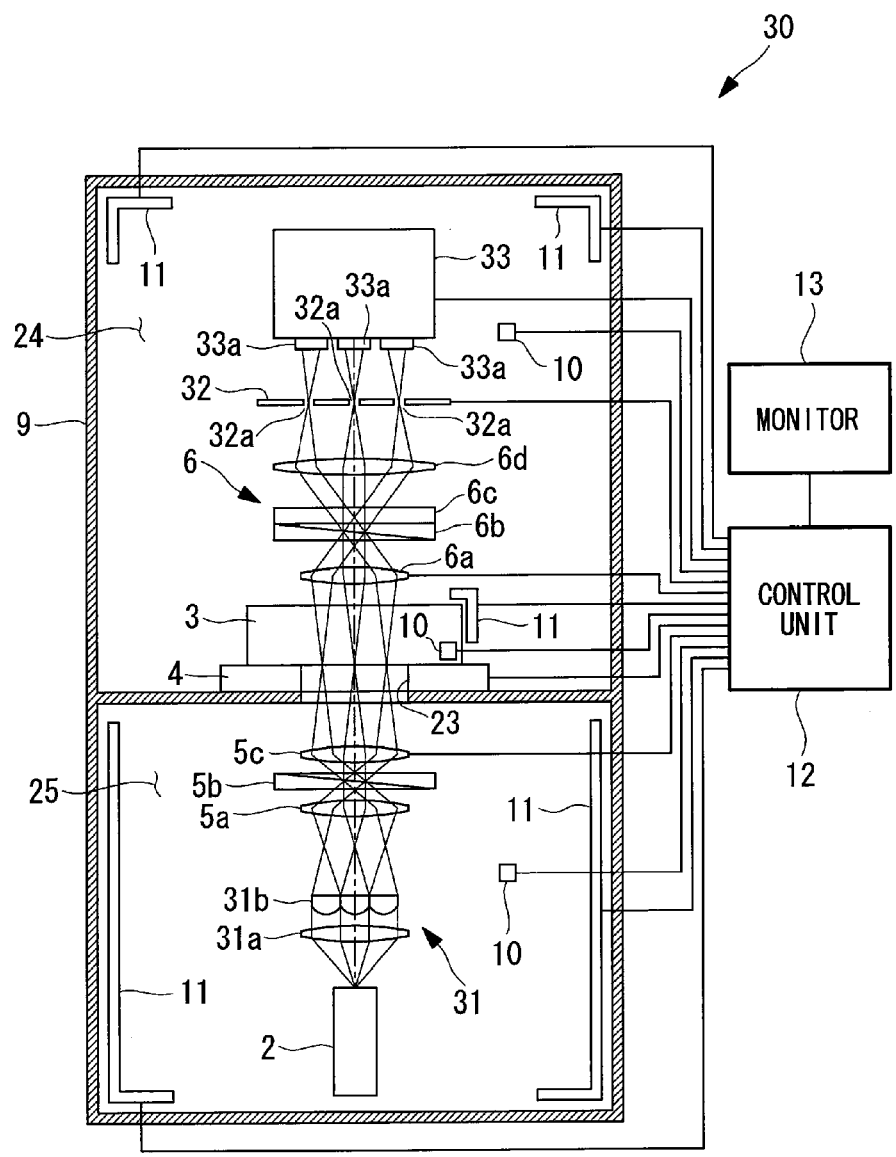
FIG. 3 is a schematic diagram showing the overall structure of a microscope system according to a second embodiment of the present invention.

As shown in FIG. 3, the microscope system 30 according to the second embodiment of the present invention includes a first light-converging optical system 31. The first light-converging optical system 31 includes a converging lens 31a that converges laser light emitted from the laser light source 2 and a micro lens array 31b that divides laser light converged by the converging lens 31a into a plurality of light fluxes. The light fluxes are converged on their respective light-converging points on the specimen A. Therefore, a pinhole member 32 has a plurality of pinholes 32a at positions optically conjugate to the light-converging points so that laser light that has passed through the light-converging points can pass through the pinhole member 32. A photodetector 33 has a plurality of light-receiving portions 33a for detecting transmitted-light fluxes that have passed through the individual pinholes 32a, respectively, independently of each other. As such a photodetector 33, a multi-anode photomultiplier or a CCD is used.

Figure 4:
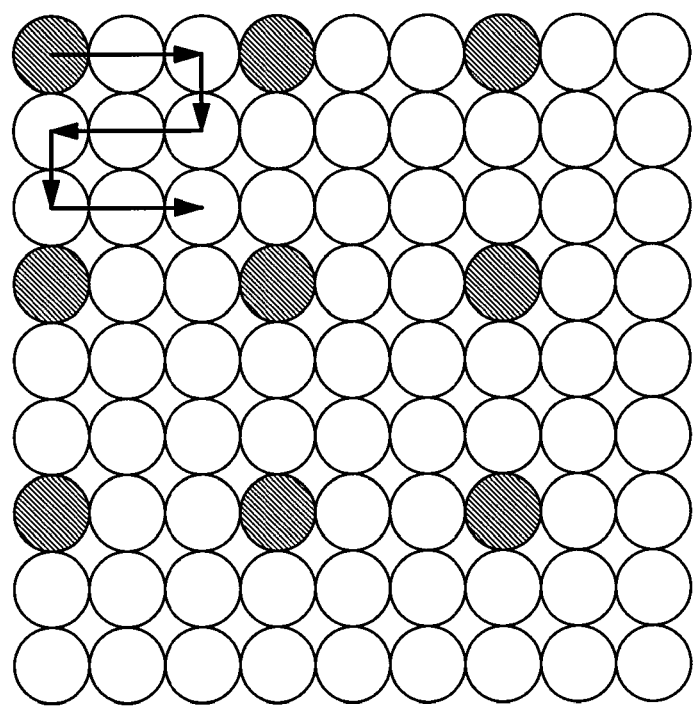
FIG. 4 is a diagram showing the light-converging points of laser light on a specimen observed by the microscope system shown in FIG. 3 and a pathway along which each of the light-converging points is transferred.

In the microscope system 30 according to the second embodiment of the present invention having such a structure as described above, laser light emitted from the laser light source 2 passes through the micro lens array 31b and is therefore divided into a plurality of light fluxes, and then, as shown in FIG. 4, the light fluxes are converged by the first light-converging optical system 31 on their respective light-converging points on the specimen A. In FIG. 4, the light-converging points are marked with diagonal lines.

Then, the specimen A is moved in a horizontal direction by driving the X stage 4a and the Y stage 4b to transfer the light-converging points on the specimen A in such a manner that, as shown by an arrow in FIG. 4, a predetermined range within a field of view is filled with the light-converging points. Transmitted-light fluxes that have passed through different positions on the specimen A are detected to acquire a transmitted-light image.

That is, the microscope system 30 according to the second embodiment of the present invention can simultaneously detect a plurality of transmitted-light fluxes that have passed through a plurality of light-converging points, and therefore can acquire an image more speedily as compared to the microscope system 1 according to the first embodiment of the present invention. Particularly, the microscope system 30 is effective at observing the moving specimen A, such as living cells, because blur can be reduced.

Further, also in the case of the second embodiment of the present invention, all the optical elements are enclosed by the housing 9 and therefore the entry of external light into the optical elements can be prevented, which makes it possible to acquire clear images. In addition, the temperature in the housing 9 is controlled to prevent the deformation of the optical elements caused by temperature difference, which makes it possible to prevent the displacement of an observation position even during prolonged observation.

It is to be noted that in the second embodiment of the present invention, as described above, the light-receiving portions 33a detect laser light fluxes that have passed through the individual pinholes 32a, respectively, independently of each other. However, laser light that has passed through each individual pinhole 32a may be detected by multiple adjacent light-receiving portions 33a (or pixels). In this case, the sum of intensities of laser light detected by the multiple adjacent light-receiving portions 33a is regarded as information obtained from one light-converging point.

Further, a plurality of the first objective lenses 5c having different magnifications and a plurality of the second objective lenses 6a having different magnifications may be provided so as to be switchable by a revolver or the like (not shown) so that the specimen A can be observed under different magnifications. In this case, the first objective lens 5c and the second objective lens 6a are switched by the control unit 12 so that they have the same magnification. Alternatively, the first objective lens 5c and the second objective lens 6a may be manually switched so that they have the same magnification.

Alternatively, only the first objective lens 5c may be switchable between different magnifications. In this case, a spatial modulator capable of changing a reflection or transmission pattern, such as a digital micromirror device (DMD) or a liquid-crystal shutter, may be used as the pinhole member 32. This makes it possible, even when the light-converging points of laser light are changed by changing the magnification of the first objective lens 5c, to change the reflection or transmission pattern of the spatial modulator depending on the positions of the light-converging points to maintain the optically conjugate positional relationship between the pinhole member 32 and the light-converging points on the specimen A.

Hereinbelow, a microscope system 40 according to a third embodiment of the present invention will be described with reference to FIGS. 5 and 6.

In the following description of the third embodiment, components having the same structure as those of the above-described microscope system 30 according to the second embodiment of the present invention are represented by the same reference numerals and description thereof will be omitted.

Figure 5:
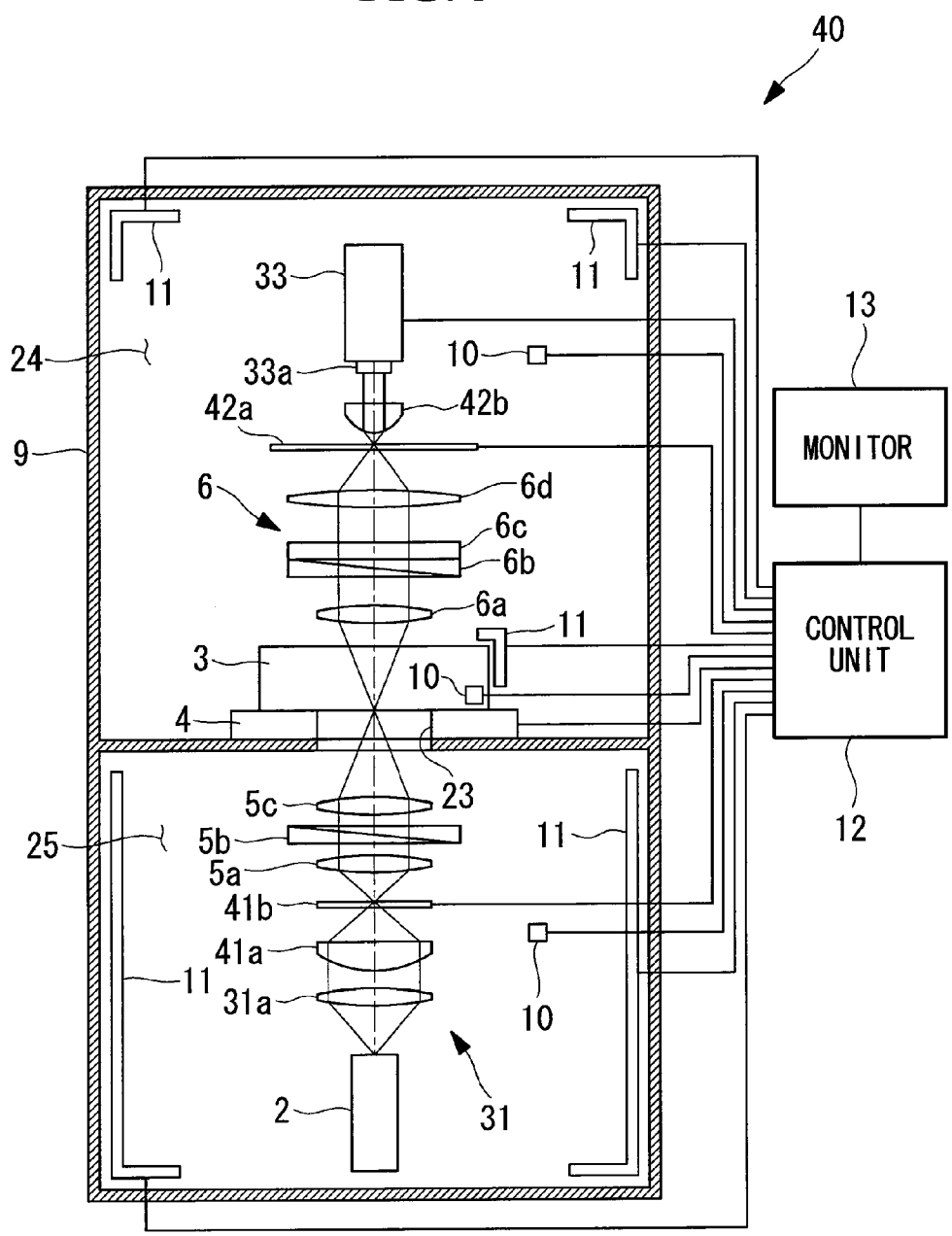
FIG. 5 is a schematic diagram showing the overall structure of a microscope system according to a third embodiment of the present invention.
Figure 6:
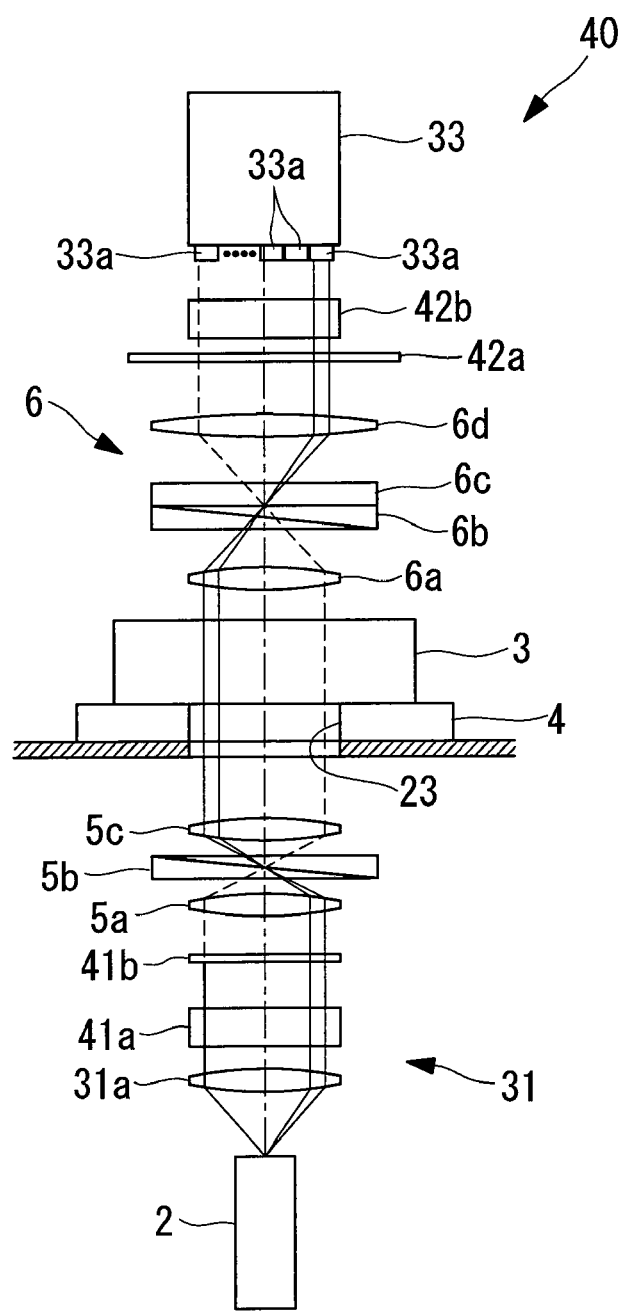
FIG. 6 is a fragmentary view of an optical system of the microscope system shown in FIG. 5, which is viewed from a direction orthogonal to the direction shown in FIG. 5.

As shown in FIGS. 5 and 6, the microscope system 40 according to the third embodiment of the present invention uses a cylindrical lens 41a and a first spatial modulator 41b, such as a DMD or a liquid-crystal shutter, instead of the micro lens array 31b used in the microscope system 30 according to the second embodiment, and uses a second spatial modulator 42a and a cylindrical lens 42b instead of the pinhole member 32.

Further, as a photodetector 43, a line CCD or a multi-anode photomultiplier including a plurality of light-receiving portions 43a arranged in line is used.

The cylindrical lens 41a constituting the first light-converging optical system 31 is configured to converge laser light emitted from the laser light source 2 into a line to allow converging laser light to enter the first spatial modulator 41b. The first spatial modulator 41b partially transmits or reflects laser light, which has been converged into a line, according to its transmission or reflection pattern to produce a plurality of light fluxes.

On the other hand, the second spatial modulator 42a constituting the second light-converging optical system 6 has such a reflection or transmission pattern that it can reflect or transmit only light incident on positions optically conjugate to the light-converging points of light fluxes on the specimen A. The cylindrical lens 42b is configured to converge transmitted-light fluxes produced by reflection or transmission through the second spatial modulator 42a to allow the transmitted-light fluxes to enter the light-receiving portions 43a arranged in line in the photodetector 43, respectively.

Figure 7:
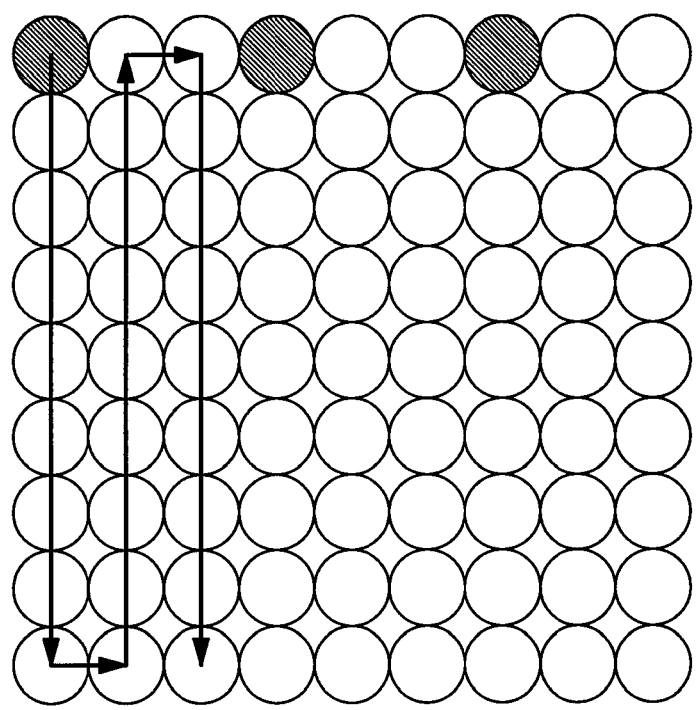
FIG. 7 is a diagram showing the light-converging points of laser light on a specimen observed by the microscope system shown in FIG. 5 and a pathway along which each of the light-converging points is transferred.

In the microscope system 40 according to the third embodiment of the present invention having such a structure as described above, laser light emitted from the laser light source 2 passes through the cylindrical lens 41a and the first spatial modulator 41b and is therefore divided into a plurality of light fluxes, and then, as shown in FIG. 7, the first light-converging optical system 31 allows the light fluxes to pass through a plurality of points on the specimen A. In FIG. 7, laser light passage positions are marked with diagonal lines.

Then, the specimen A is moved in a horizontal direction by driving the X stage 4a and the Y stage 4b to transfer the laser light passage positions on the specimen A in such a manner that, as shown by an arrow in FIG. 7, a predetermined range within a field of view is filled with light-converging points. Transmitted-light fluxes that have passed through different positions on the specimen A are detected to acquire a transmitted-laser light image.

As in the case of the microscope system 30 according to the second embodiment of the present invention, the microscope system 40 can simultaneously detect a plurality of transmitted-light fluxes that have passed through a plurality of light-converging points, and therefore can acquire an image more speedily. Particularly, the microscope system 40 is effective at observing the moving specimen A such as living cells because blur can be reduced.

Further, also in the case of the third embodiment of the present invention, all the optical elements are enclosed by the housing 9 and therefore the entry of external light into the optical elements can be prevented, which makes it possible to acquire clear images. In addition, the temperature in the housing 9 is controlled to prevent the deformation of the optical elements caused by temperature difference, which makes it possible to prevent the displacement of an observation position even during prolonged observation.

Hereinbelow, a microscope system 50 according to a fourth embodiment of the present invention will be described with reference to FIG. 8.

In the following description of the fourth embodiment, components having the same structure as those of the microscope system 1 according to the first embodiment of the present invention are represented by the same reference numerals, and description thereof will be omitted.

Figure 8:
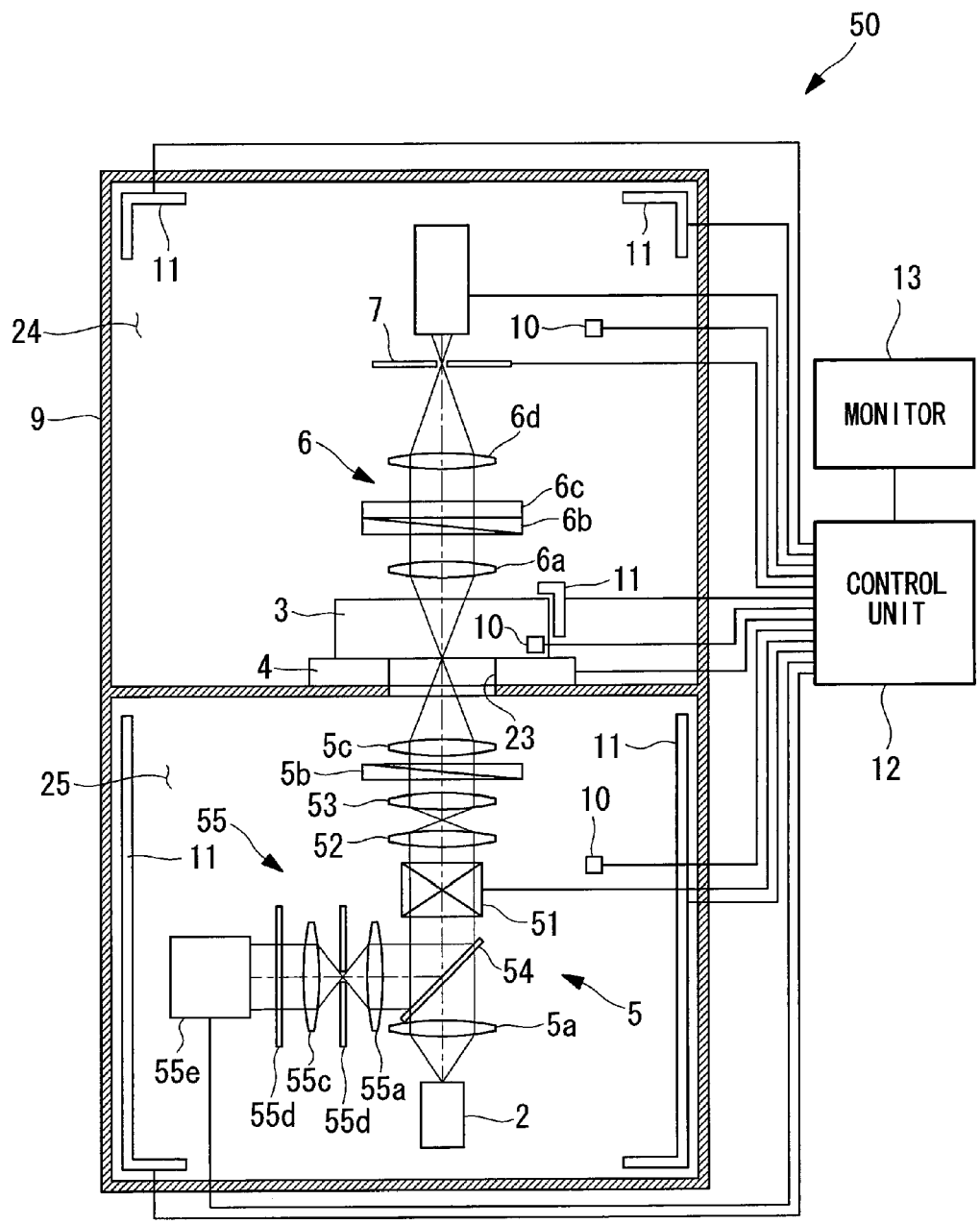
FIG. 8 is a schematic diagram showing the overall structure of a microscope system according to a fourth embodiment of the present invention.

As shown in FIG. 8, the microscope system 50 according to the fourth embodiment of the present invention further includes a scanner 51 that two-dimensionally scans laser light converged by the converging lens 5a, a pupil projecting lens 52 that converges laser light scanned by the scanner 51, an imaging lens 53, a dichroic mirror 54, and a fluorescence detection optical system 55. The dichroic mirror 54 is provided between the scanner 51 and the converging lens 5a to separate fluorescence, which is generated at the specimen A and returned to the laser light source 2 side, from an optical path of laser light.

The scanner 51 is, for example, a proximity galvanometer mirror including two galvanometer mirrors (not shown) which are placed opposite to each other and capable of oscillating about different axes. By synchronously oscillating the two galvanometer mirrors, it is possible to two-dimensionally scan laser light over the specimen A. On the other hand, oscillation of the galvanometer mirrors may be stopped so that laser light comes to rest. However, also in this case, laser light can be two-dimensionally scanned over the specimen A by moving the stage 4.

The fluorescence detection optical system 55 includes a confocal lens 55a, a confocal pinhole 55b, a converging lens 55c, a barrier filter 55d, and a photodetector 55e including a photomultiplier. The confocal lens 55a converges fluorescence separated by the dichroic mirror 54. The confocal pinhole 55b is placed at a focal position of the confocal lens 55a so that only fluorescence passing through the focal position can pass through the confocal pinhole 55b. The converging lens 55c converges fluorescence that has passed through the confocal pinhole 55b. The barrier filter 55d cuts off laser light contained in fluorescence. The photodetector 55e detects fluorescence that has passed through the barrier filter 55d.

All the optical elements of the microscope system 50 according to the fourth embodiment of the present invention are arranged within the housing 9, and the temperature in the housing 9 is controlled.

In the case of the microscope system 50 according to the fourth embodiment of the present invention having such a structure as described above, diascopic confocal observation of transmitted light can be performed by moving the stage 4 with the scanner 51 stopped and episcopic confocal observation of fluorescence generated at the specimen A can be performed by driving the scanner 51 with the stage 4 stopped.

Also in the case of the microscope system 50 according to the fourth embodiment of the present invention, all the optical elements are enclosed by the housing 9, and therefore the entry of external light into the optical elements can be prevented, which makes it possible to acquire clear transmitted-light images and fluorescence images. In addition, the temperature in the housing 9 is controlled to prevent the deformation of the optical elements caused by temperature difference, which makes it possible to prevent the displacement of an observation position even during prolonged observation.

Since the microscope system 50 uses the scanner 51, fluorescence images can be acquired at a high frame rate. Further, diascopic confocal observation of transmitted light and observation of fluorescence generated at the specimen A may be simultaneously performed by moving the stage 4 with the scanner 51 stopped. In this case, transmission images and fluorescence images can be simultaneously acquired. Therefore, the microscope system 50 according to the fourth embodiment of the present invention is suitable for use in, for example, observation of alteration of cellular morphology by comparison between transmission images and fluorescence images.

It is to be noted that in each of the above-described embodiments, the laser light source 2 is arranged within the housing 9, but may be arranged outside the housing 9.

Further, in each of the above-described embodiments, the stage is configured to be moved in a direction orthogonal to the optical axis of an optical system, but the whole optical system may be moved with the stage fixed.

Further, each of the above-described embodiments uses an optical system including the first differential interference element 5b, the second differential interference element 6b, and the polarization element 6c to acquire differential interference contrast images, but instead of such an optical system, may use a light-converging optical system for phase-contrast observation including a phase ring (not shown) as the second light-converging optical system 6 and a phase film (not shown) as the first light-converging optical system 5.

What is claimed is:

1. A microscope system comprising:
a culture unit for holding and cultivating a specimen while maintaining constant temperature and humidity;
a stage for holding the culture unit;
a first light-converging optical system for converging illumination light emitted from a light source on the specimen;
a second light-converging optical system for converging transmitted light that has passed through the specimen irradiated with illumination light converged by the first light-converging optical system;
a transmitted-light pinhole provided at a position optically conjugate to a light-converging position of illumination light on the specimen to cut off part of transmitted light converged by the second light-converging optical system;
a transmitted-light detector that detects transmitted light that has passed through the transmitted-light pinhole;
a moving system for moving the stage relative to the first and second light-converging optical systems, the transmitted-light pinhole, and the transmitted-light detector;
a housing that encloses the culture unit, the stage, the first light-converging optical system, the second light-converging optical system, the transmitted-light pinhole, the transmitted-light detector, and the moving system, wherein the housing cuts off external light; and
a control unit for (i) controlling a temperature in the housing, (ii) controlling the moving system so as to control a relative position between the stage and both of the first light-converging optical system and the second light-converging optical system, and (iii) storing data of an intensity of the transmitted light detected by the transmitted-light detector and information of the relative position in correspondence with each other;
wherein the control unit is configured to create a two-dimensional image of the specimen by arranging the data of the intensity of the transmitted light based on the information of the relative position.

2. The microscope system according to claim 1, further comprising:
a scanning unit provided between the light source and the first light-converging optical system to scan illumination light emitted from the light source;
a fluorescence separation unit for separating fluorescence generated at the specimen by allowing the scanning unit to scan illumination light over the specimen, converged by the first light-converging optical system, and returned via the scanning unit;
an incident-light pinhole provided at a position optically conjugate to the specimen to cut off part of fluorescence separated by the fluorescence separation unit; and
an incident-light detector that detects fluorescence that has passed through the incident-light pinhole,
wherein the housing further encloses the scanning unit, the fluorescence separation unit, the incident-light pinhole, and the incident-light detector.

3. The microscope system according to claim 1, wherein:
the culture unit held on the stage includes a culture vessel for holding a culture broth, and the second light-converging optical system is arranged at a position away from a surface of the culture broth;
wherein the stage is provided between the first light-converging optical system and the second light-converging optical system, the first light-converging optical system is provided at a lower side of the stage, and the second light-converging optical system is provided at an upper side of the stage; and
wherein the microscope system further comprises:
a liquid-level detection unit for detecting a liquid level of the culture broth; and
a position adjusting system for adjusting a position of at least one of the transmitted-light pinhole and the second light-converging optical system in a direction along an optical axis based on a position of the surface of the culture broth detected by the liquid-level detection unit.

4. The microscope system according to claim 3, wherein the control unit is configured to control the position adjusting system based on the position of the surface of the culture broth detected by the liquid-level detection unit.

5. The microscope system according to claim 1, wherein:
the culture unit held on the stage includes a culture vessel for holding a culture broth;
the second light-converging optical system comprises an immersion lens at a culture vessel side thereof, the immersion lens being kept immersed in the culture broth held in the culture broth; and
the stage is provided between the first light-converging optical system and the second light-converging optical system, the first light-converging optical system is provided at a lower side of the stage, and the second light-converging optical system is provided at an upper side of the stage.

6. The microscope system according to claim 1, wherein the light source is a laser light source that emits laser light;
wherein the microscope system further comprises:
a first differential interference element that divides laser light emitted from the laser light source into polarization components having polarization planes intersecting orthogonally to each other before the laser light enters the specimen;

a second differential interference element that combines polarization components, which have polarization planes intersecting orthogonally to each other and have passed through the specimen, into polarized light having a single polarization plane; and a polarization element that cuts off light other than combined polarized light produced by the second differential interference element; and wherein the housing further encloses the first and second differential interference elements and the polarization element.

7. The microscope system according to claim 1, wherein the first and second light-converging optical systems are light-converging optical systems for phase-contrast observation.

8. The microscope system according to claim 1, further comprising a light flux separation unit for separating illumination light emitted from the light source into a plurality of light fluxes, wherein a plurality of the transmitted-light pinholes are provided at positions optically conjugate to light-converging positions of a plurality of light fluxes separated by the light flux separation unit on the specimen, and wherein a plurality of the transmitted-light detectors are provided to detect a plurality of illumination light fluxes that have passed through the transmitted-light pinholes, respectively.

9. The microscope system according to claim 8, wherein a plurality of the first light-converging optical systems having different magnifications are provided so as to be switchable, and a plurality of the second light-converging optical systems having different magnifications are provided so as to be switchable, and wherein when magnification is changed, the first and second light-converging optical systems are switched so as to have the same magnification.

10. The microscope system according to claim 8, wherein a plurality of the first light-converging optical systems having different magnifications are provided so as to be switchable, and wherein the transmitted-light pinholes are formed by a spatial modulator capable of changing a reflection or transmission pattern, and wherein when the magnification of the first light-converging optical system is changed, the reflection or transmission pattern of the transmitted-light pinholes is changed.

11. The microscope system according to claim 1, further comprising:

a conversion optical system for converting illumination light emitted from the light source into a line beam;

a first spatial modulator configured to be capable of changing a reflection or transmission pattern to selectively reflect or transmit part of a line beam converted by the conversion optical system to produce a plurality of light fluxes; and a second spatial modulator that is configured to be capable of changing a reflection or transmission pattern and is driven so that reflection or transmission positions thereof have an optically conjugate relationship with those of the first spatial modulator, wherein a plurality of the transmitted-light pinholes are provided by the second spatial modulator and a plurality of the transmitted-light detectors are provided to detect a plurality of illumination light fluxes that have passed through the transmitted-light pinholes, respectively.

* * * * *